(12) United States Patent
Igarashi et al.

(10) Patent No.: US 8,469,069 B2
(45) Date of Patent: Jun. 25, 2013

(54) TREAD BAND WITH GROOVES PROVIDED WITH A NOISE-REDUCING DEVICE

(75) Inventors: Masashi Igarashi, Susono (JP);
Masayuki Maesaka, Ota (JP); Ludovic Greverie, Ota (JP); Salvatore Pagano, Ota (JP)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 351 days.

(21) Appl. No.: 12/682,426

(22) PCT Filed: Oct. 21, 2008

(86) PCT No.: PCT/EP2008/064197
§ 371 (c)(1),
(2), (4) Date: Jul. 9, 2010

(87) PCT Pub. No.: WO2009/053353
PCT Pub. Date: Apr. 30, 2009

(65) Prior Publication Data
US 2011/0000595 A1    Jan. 6, 2011

(30) Foreign Application Priority Data
Oct. 24, 2007  (FR) .................................... 07 58544

(51) Int. Cl.
*B60C 11/13*    (2006.01)
(52) U.S. Cl.
USPC .............. 152/209.22; 152/209.2; 152/209.18; 152/209.19

(58) Field of Classification Search
USPC ......... 152/209.18, 458, 209.4, 209.2, 209.22, 152/209.19, 209.21
See application file for complete search history.

(56) References Cited

U.S. PATENT DOCUMENTS 3,149,658 A * 9/1964 Wolfe .................. 152/209.4
6,343,843 B1 2/2002 Nishikawa
(Continued)

FOREIGN PATENT DOCUMENTS

EP    0 691 224 A2    1/1996
FR    2 348 068 A    11/1977
(Continued)

OTHER PUBLICATIONS

JP 11-048718, Feb. 1999, English translation [retrieved on Jul. 24, 2012 from http://www4.ipdl.inpit.go.jp/Tokujitu/PAJdetail.ipdl?N0000=60&N0120=01&N2001=2&N3001=H11-048718].*

(Continued)

*Primary Examiner* — Eric Hug
(74) *Attorney, Agent, or Firm* — Buchanan Ingersoll & Rooney PC

(57) ABSTRACT

A tread 1 having a tread surface 3 onto which there opens at least one cavity 2, this cavity being bounded by a cavity wall 20 comprising a bottom wall 21 extended by a side wall 22 intersecting the tread surface to form at least one edge corner 31, this tread being, over at least part of the wall of the cavity 2, provided with a plurality of supporting strands 4, each supporting strand 4 comprising two ends of which one end 41 is attached to the cavity wall 20, this tread being characterized in that the supporting strands 4 each comprise at least one branching formed by the attachment of at least one branching strand 5.

8 Claims, 2 Drawing Sheets

U.S. PATENT DOCUMENTS 6,484,773 B1 * 11/2002 Bruant ..................... 152/209.4
2005/0092414 A1   5/2005 Jones et al.

FOREIGN PATENT DOCUMENTS

| JP | 63-291709 A | 11/1988 |
| JP | 11-48718 A | 2/1999 |
| JP | 11-91319 A | 4/1999 |
| WO | WO 97/18960 A1 | 5/1997 |

OTHER PUBLICATIONS

International Search Report (PCT/ISA/210) dated Dec. 30, 2008.

* cited by examiner

TREAD BAND WITH GROOVES PROVIDED WITH A NOISE-REDUCING DEVICE

The invention relates to tires and, in particular, to devices for reducing the rolling noise of tires.

In order to reduce the rolling noise due to the presence of grooves on the tread of a tire and to the creation of acoustic resonance resulting from the flow of air through these grooves, it is known practice to provide the walls that delimit the said grooves with strands or protrusions. These strands or protrusions, while preventing the creation of acoustic resonance, allow water to pass so as to allow safe running in rainy weather and on roads covered with water (mention may, in particular, be made of the documents published under the references JP11-91319-A and EP0691224-A2).

However, it has been found that it was very often impossible to obtain a structure comprising a plurality of strands with a high volume density of filling with strands in order to improve the reduction of resonant noise significantly. Furthermore, it is necessary to have appropriate lengths of strand in order satisfactorily to fill the grooves, and this makes it difficult to install strands of long length.

One objective of the present invention is to provide a solution to this problem, that is to say to propose a tread that has cavities open onto the tread surface of this tread and provided with strands with cavity fill densities very much higher than the customary densities.

To do this, there is proposed a tread having a tread surface onto which there opens at least one cavity (such as a groove for example), this cavity being bounded by a cavity wall comprising a bottom wall extended by a side wall intersecting the tread surface to form at least one edge corner, this tread being, over at least part of the wall of the cavity, provided with a plurality of supporting strands, each supporting strand comprising two ends of which one end is attached to the cavity wall, this tread being characterized in that the supporting strands each comprise at least one branching formed by the attachment of at least one branching strand.

In one embodiment of a tread according to the invention, the supporting strands attached to the cavity wall are attached only to the bottom wall of the cavity with the exclusion of the side walls.

For preference, the supporting strands are chosen from the group consisting of nylon, PET, acrylic, cotton, flax, wool and rayon fibers.

The supporting strands have a length ranging between 0.3 and 5 mm and a diameter of at least 20 microns ($\mu$) and at most 80 microns ($\mu$).

Furthermore, the branching strands are chosen from the group consisting of fibers of the following type: nylon, PET, acrylic, cotton, flax, wool and rayon. The branching strands have a length ranging between 0.2 and 3.2 mm and a diameter of at least 20 microns ($\mu$) and at most 80 microns ($\mu$).

For preference, the tread according to the invention has a supporting strand density of at least 2 and at most 50 strands per unit area expressed in $mm^2$ (square millimeters).

For practical purposes, the supporting strands are applied to the cavities of a tread using a flocking process (described notably in the patent document published under the reference EP0691224A2). Likewise, the branchings with the branching strands are formed by using the same type of flocking process. It is possible to use masks that concentrate the application of supporting strands and branching strands on determined parts of the tread. According to the known flocking process, having coated the surface that is intended to receive the supporting strands with adhesive, the branching strands are deposited electrostatically by subjecting the strands and the tread to an electrical field that creates a high potential difference of the order of 10 kV. This same operation is repeated to apply the branching strands.

A distinction is made between two different embodiments which display the same advantage towards the problem being addressed. These are: application of the branching strands to lengthen the supporting strands or application whereby each supporting strand is provided with a great many branching strands with a view to creating a high volume density of branching strands. In the first embodiment (lengthening of the supporting strands), a high density of strands is likewise achieved in the groove because, since the strands are lengthened, they are liable to flex and bend to occupy a greater volume.

Through this process, it is possible to apply a greater length of strands to a cavity in the tread by lengthening the supporting strands using strands of the same or different nature.

The process that has just been described is an effective way of applying a plurality of fibers to the surface of a cavity of any body (notably a tire) so that they occupy a high volume density. To this end, the process according to the invention involves the following steps:

- coating the surface that is intended to receive the strands with an appropriate adhesive;
- electrostatically depositing the supporting strands on the said surface by subjecting the tread to an electrical field that creates a high potential difference;
- coating the supporting strands with an adhesive in order to attach the branching strands;
- electrostatically depositing the branching strands by subjecting the strands and the tread to an electrical field that creates a high potential difference.

It being possible for this last operation to be repeated as many times as required.

Other features and advantages of the invention will become apparent from the description given hereinafter with reference to the attached drawings which, by way of nonlimiting examples, show some embodiments of the subject matter of the invention.

FIG. 1 shows, in cross section, a groove the bottom of which is provided with a plurality of supporting strands lengthened with branching strands;

FIG. 2 shows a second embodiment of grooves provided with a plurality of supporting strands to which a plurality of branching strands are grafted;

FIG. 3 shows, in cross section, a groove the side walls of which are provided with a plurality of strands bearing multiple branchings;

FIG. 4 shows the implementation of the flocking process that allows the branching strands to be connected to the supporting strands in order to lengthen the supporting strands;

FIG. 5 shows the implementation of the flocking process whereby a plurality of branching strands is combined with a single supporting strand.

Figure 4:
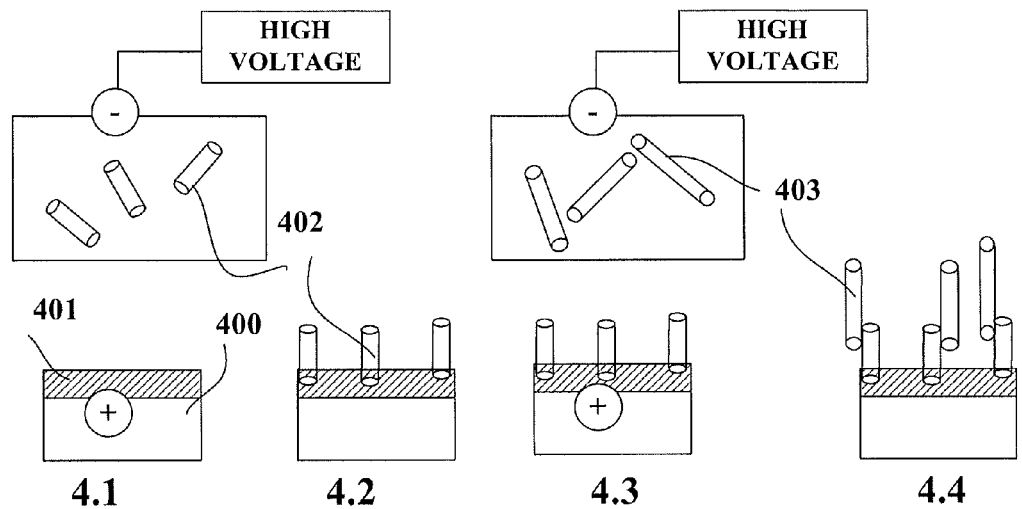

In this first embodiment of the invention, the bottom wall 21 of the groove 2 is provided with a plurality of supporting strands 4 of which one end 41 is attached to the said wall 21. These supporting strands 4 are made of nylon and have a maximum length (3 mm) equal to 40% of the depth H which, in this instance, is equal to 7.5 mm. These supporting strands 4 are attached to the bottom wall 21 by a flocking process that can be described as follows: after an adhesive composition has been deposited on the bottom wall of the groove, the adhesive in the groove and the strands or fibers are subjected to an electrical field that generates a high electrical potential difference between the supporting strands or fibers in general and the bottom wall. In this way, the supporting strands are fastened to a wall in an appropriate density. Thereafter, a similar operation is performed between the supporting strands and the branching strands which are chosen to be identical to the supporting strands. In this latter operation and prior to the application of the electrical field, a composition that causes the branching strands to stick is sprayed onto the supporting strands. As described above, it is then possible to lengthen the supporting strands using, notably, identical strands (as shown by FIG. 4). The mean length of the supporting strands and of the branching strands is 3 mm here. This last operation could be repeated to extend the branching strands so that they, to a large extent, occupy the entire depth of the groove. The density of supporting strands which here is 30 strands per unit area expressed in square millimeters ($mm^2$). This density preferably ranges between 2 to 50 strands per $mm^2$.

The branching strands 5 in this particular instance are strands of the same dimensions and same nature as the supporting strands 4, that is to say strands made of nylon. These branching strands 5 have a substantially circular cross section with a diameter equal to 42 microns (preferably ranging between 20 to 80 microns).

Figure 2:
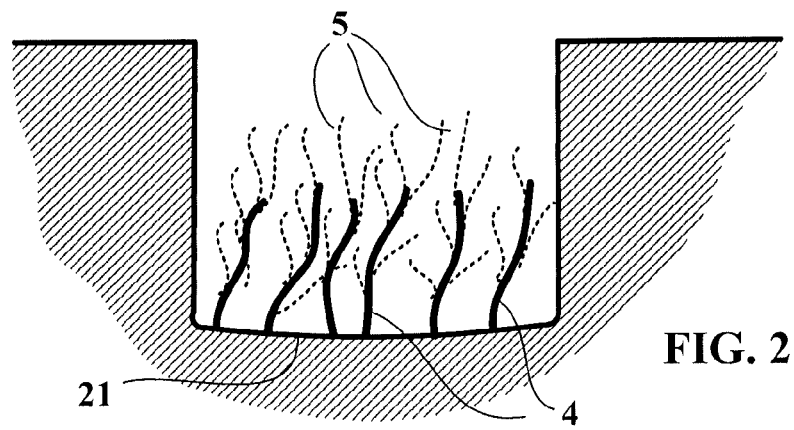
Figure 5:
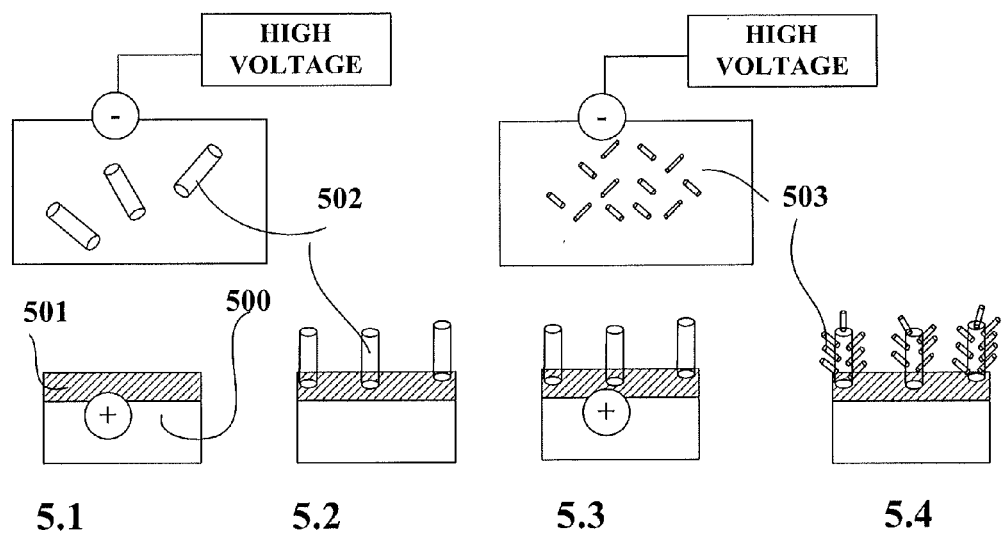

In a second embodiment shown in FIG. 2, once the supporting strands 4 have been attached in exactly the same way as in the first embodiment, a plurality of branching strands 5 are caused to adhere to each supporting strand 4; in this case, use is preferably made of branching strands 5 of a smaller cross section and shorter length by comparison with the dimensions of the supporting strands. In the example given, the branching strands 5 are made of nylon and have a mean length of the order of 0.8 mm. The deposition process is shown in FIG. 5. In this embodiment, the supporting strand density is preferably chosen to be from 2 to 15 strands per unit area ($mm^2$) so as to allow effective branching, that is to say to obtain a high degree of volume occupation by the branching strands. This degree of volume occupation is obtained by a number of branchings of at least 5 per supporting strand.

On average, each supporting strand supports 5 to 15 branching strands in order to attain a degree of occupation of the volume of the groove that is optimal and therefore as high as possible. The operation of a spraying adhesive and then of forming the branching can be repeated after a first series of branching strands have been applied: when such is the case, the new branching strands branch from the supporting strands and from the branching strands already in place.

Figure 1:
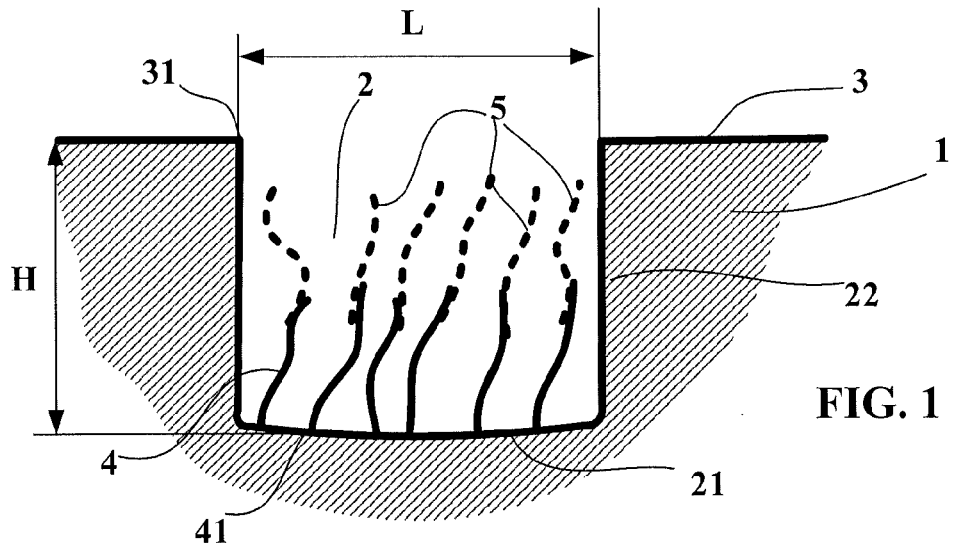
FIG. 1 shows a cross section of a groove 2 formed in a tread 1 of a tire. This groove 2 comprises a bottom wall 21 extended by side walls 22 which intersect a tread surface 3 of the tread at edge corners 31. This groove 2 has a depth H and a width L.

Of course, it is possible to combine the first embodiment (FIG. 1) with the second (FIG. 2) by grafting branching strands as shown in the second embodiment onto the lengthened supporting strands of the first.

In an embodiment that has not been shown, a plurality of supporting strands have both ends adhering to the bottom wall of the groove; this provides better anchorage for the collection of supporting strands and branching strands particularly under the action of the flow of liquids (when running in the rain, for example).

For preference, the supporting strands are chosen to have the following dimensions: a length ranging between 0.3 and 5 mm (for a groove with a mean depth ranging from 7 to 8 mm) and a diameter ranging between 20 and 80 microns. It is important for the supporting strands combined with the branching strands to have appropriate flexural rigidities in order not to impede the flow of liquid through the grooves too greatly when running on wet ground.

In order to obtain an appreciable effect in passenger vehicle tire performance (with mean groove dimensions: groove depth H ranging from 7 to 8 mm and width L from 6 to 7 mm), it is recommended that at least one and at most ten branchings be formed on each supporting strand. The higher the surface density of supporting strands the less need there is to create branchings (just one may suffice); by contrast, a high volume occupation of the groove by the strands can be attained with a low surface density of supporting strands combined with a high number of branchings (at least more than 5).

Figure 3:
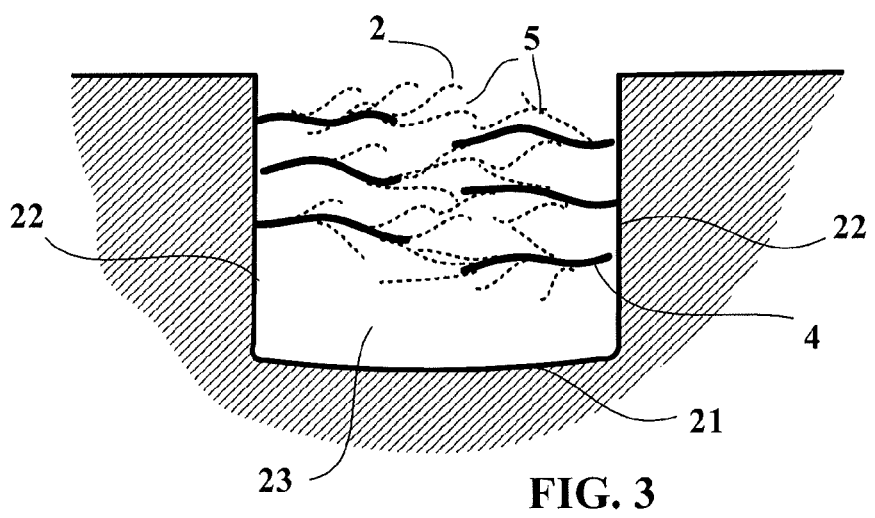

FIG. 3 shows an embodiment of a tread groove according to the invention. In this embodiment, it is the side walls 22 of the groove 2, which are provided with a plurality of supporting strands 4 attached to the said walls and to which a plurality of branching strands 5 are grafted by adhesive bonding. In this embodiment, it is possible to leave a passage 23 practically free of strands or at the very least with a reduced strand density near the bottom of the groove. Hence, when the tread is part-worn, the grooves having reduced depths accordingly, are practically unobstructed by strands, thus maintaining an adequate water-clearing function.

In one, not described, embodiment of a tread according to the invention, the supporting strands are arranged with an appropriate density to allow the branching strands to be attached as close as possible to the ends of the supporting strands that are attached to the wall of the cavity.

FIG. 4 shows implementation of the flocking process whereby the supporting strands 402 having a diameter ranging from 20 to 80 microns and a mean length ranging from 3 to 5 mm (inclusive of end point values) are extended by a branching strand 403 with dimensional characteristics identical to that of the supporting strands. First of all, a body 400 is coated on one surface with an adhesive 401 for attaching strands. Supporting strands 402 are subjected to a high negative electrical charge while the body 400 and the adhesive 401 are subjected to a high positive electrical charge (FIG. 4.1). Under the action of these charges, the supporting strands 402 are released and sprayed onto the adhesive-coated surface of the body 400 (FIG. 4.2). The density of supporting strands 402 ranges between 2 and 50 strands per square millimeter of area of the body 400 (inclusive of end point values). In a second step (FIG. 4.3), branching fibers 403 are sprayed onto the supporting fibers in situ on the body 400 by subjecting these branching fibers to a high negative electrical charge while the body 400, the adhesive 401 and the supporting fibers 402 are subjected to a high positive electrical charge. FIG. 4.4 shows the surface of the body 400 covered with supporting strands 402 extended by branching strands 403. The adhesive 401 used for coating the supporting strands 402 and the branching strands 403 with adhesive is an epoxy-type resin or preferably a water-soluble adhesive so as to lessen the increase in rigidity associated with the sticking of the branching strands 403 to the supporting strands 402.

In another embodiment shown in FIG. 5, use is made of the same supporting strands 502 as were used in the description of the embodiment shown in FIG. 4. A first step (FIGS. 5.1 and 5.2) applies supporting strands 402 to an adhesive-coated surface 501 of a body 500 in the same way. In a second step (FIG. 5.3) a collection of branching fibers 503 which are smaller in size than the supporting fibers are negatively charged. Through this operation, a plurality of branching fibers 503 can be attached to, each supporting fiber 502 as shown in FIG. 5.4. The density of supporting strands 502 here preferably ranges between 2 to 15 strands per square millimeter (inclusive of end point values). The branching strands 503 have a length ranging from 0.2 to 1 mm and a diameter of 10 to 30 microns.

The invention is not restricted to the embodiments described and depicted and various modifications can be made thereto without departing from its scope.

In particular, it is possible to use strands made of rubber having a diameter ranging from 0.1 to 0.4 mm in diameter for a length of 1 to 3 mm. In this case, the surface density is preferably at least 2 and at most 20 strands per $mm^2$.

The invention claimed is:

1. A tread for a tire having a tread surface comprising:
   at least one cavity opening onto the tread surface, wherein the cavity is bounded by a cavity wall comprising a bottom wall extended by a side wall intersecting the tread surface to form at least one edge corner;
   a plurality of supporting strands disposed over at least part of the cavity wall, wherein each supporting strand comprises a first end attached to the cavity wall and a second end, and at least one branching formed by the attachment of at least one branching strand, wherein the supporting strands have a length of at least 0.3 mm and at most 5 mm, and a diameter ranging between 20 and 80 microns.

2. The tread according to claim 1, wherein the supporting strands attached to the cavity wall are attached only to the bottom wall of the cavity.

3. The tread according to claim 1 wherein the density of supporting strands is at least equal to 2 strands per $mm^2$ and at most equal to 50 strands per $mm^2$.

4. The tread according to claim 1, wherein the branching strands are chosen from the group consisting of nylon, PET, acrylic, cotton, flax, wool and rayon fibers.

5. The tread according to claim 4, wherein the branching strands have a length ranging between 0.2 and 3.2 mm and a diameter ranging between 20 and 80 microns.

6. A tread for a tire having a tread surface comprising:
   at least one cavity opening onto the tread surface, wherein the cavity is bounded by a cavity wall comprising a bottom wall extended by a side wall intersecting the tread surface to form at least one edge corner;
   a plurality of supporting strands disposed over at least part of the cavity wall, wherein each supporting strand comprises a first end attached to the cavity wall and a second end, and at least one branching formed by the attachment of at least one branching strand, wherein the branching strands have a diameter of cross section smaller than the diameter of the cross section of the supporting strands and have a length shorter than the length of the supporting strands.

7. A tread for a tire having a tread surface comprising:
   at least one cavity opening onto the tread surface, wherein the cavity is bounded by a cavity wall comprising a bottom wall extended by a side wall intersecting the tread surface to form at least one edge corner;
   a plurality of supporting strands disposed over at least part of the cavity wall, wherein each supporting strand comprises a first end attached to the cavity wall and a second end, and at least one branching formed by the attachment of at least one branching strand, wherein the branching strands and the supporting strands are attached by a "flocking" process.

8. A tread for a tire having a tread surface comprising:
   at least one cavity opening onto the tread surface, wherein the cavity is bounded by a cavity wall comprising a bottom wall extended by a side wall intersecting the tread surface to form at least one edge corner;
   a plurality of supporting strands disposed over at least part of the cavity wall, wherein each supporting strand comprises a first end attached to the cavity wall and a second end, and at least one branching formed by the attachment of at least one branching strand, wherein the supporting strands are attached only to the side wall of the cavity thereby leaving a passage free of any protrusion in the region of the bottom wall of the cavity.

* * * * *